UNITED STATES PATENT OFFICE 2,837,119
Patented June 3, 1958

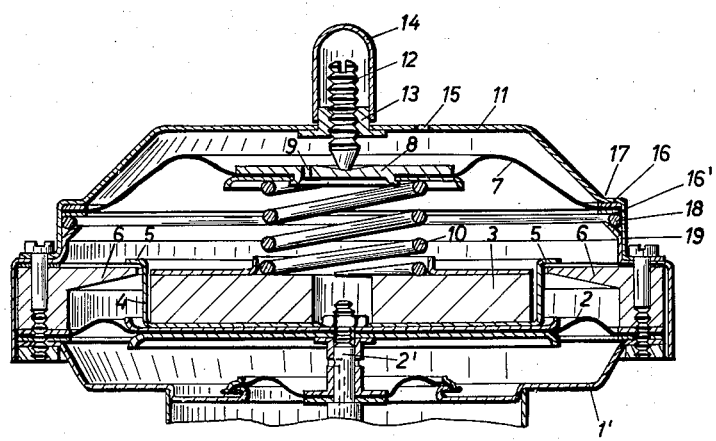

2,837,119

COMBINED CONTROL DIAPHRAGM AND SAFETY DIAPHRAGM FOR GAS PRESSURE REGULATOR

Karl H. Schwarz, Chicago, Ill., and Josef Drabik, near Osnabruck, Germany, assignors to G. Kromschroder Aktiengesellschaft, Osnabruck, Germany Application November 9, 1954, Serial No. 467,695

Claims priority, application Germany November 12, 1953

3 Claims. (Cl. 137—785)

This invention relates to a diaphragm type gas pressure regulator having a safety diaphragm disposed above the control diaphragm. As is known, the safety diaphragm serves to prevent the escape of larger quantities of gas in case of leakage or breakage of the control diaphragm. Since in such gas pressure regulators the space above the control diaphragm communicates with the atmosphere through an opening in the cover of the casing, gas would be allowed to escape in dangerous quantities through the cover opening in case of leakages or breakage as referred to above, if no safety diaphragm is provided. The opening in the cover must be relatively large dimensioned as otherwise a throttling would occur which obstructs the regulating operation. By the interposition of the safety diaphragm having only a very small nozzle type opening on the one hand the regulating operation of the control diaphragm is not obstructed and on the other hand, in case of a damage occurred to the control diaphragm, the quantity of the escaping gas is so reduced that no living being is endangered.

When using such a safety diaphragm, there was up to now no alternative than to renounce the possibility to adjust the load to the control diaphragm, i. e. the nominal control value, from the outside. The invention is directed to means which make such adjustment possible while using the safety diaphragm. The safety diaphragm carries a diaphragm plate in its center. This plate supports at its one side a compression spring which acts on the control diaphragm, while the other side of this diaphragm plate is in contact with a stop, preferable adjusting screw arranged in the cover of the casing and can be adjusted in axial direction from the outside.

With such an arrangement only the outer border zone of the safety diaphragm follows the movement of the regulating operation of the control diaphragm. In this case, the control diaphragm acts simultaneously as a pass through diaphragm for the tensioning movement of the load spring.

With such an arrangement there exists the further possibility of providing for the locking of the movable parts of the regulating mechanism during transportation of the apparatus. Such locking of the movable parts is effected by actuating an adjusting member to be operated from the outside. This adjusting member must be pressed against and fixed by means of a stop.

For a fuller understanding of the object and the nature of the invention reference should be had to the detailed description in conjunction with the accompanying drawing illustrating in cross section a preferred embodiment of the invention by way of example.

In the embodiment selected for illustration the numeral 1' designates the casing which frames the control diaphragm 2 to which the shaft 2' of the control valve, not fully shown, is fastened. The control diaphragm 2 is loaded by the weights 3 which are located in a cup shaped part 4. The external peripheral flange 5 of the part 4 can be used to rest on shoulders 6 which are rigidly connected with the casing. A safety diaphragm 7 carrying a diaphragm plate 8 in its center is arranged above the control diaphragm 2. The plate 8 is provided with a small nozzle type opening 9 and is pressed against an adjusting screw 12 disposed in the casing cover 11 by the action of a load spring 10 which rests on the weights 3. The adjusting screw 12 is located in a screw bushing 13 which is fixed in the cover 11, a protective cap 14 covering the adjusting screw 12 being screwed on to the screw bushing 13. An opening 15 which is large when compared with the nozzle type opening 9 is provided in cover 11 and serves to establish the communication with the atmosphere.

The safety diaphragm 7 is fastened as follows: The rim of the diaphragm which is framed by the rings 16, 16' is pressed against a sealing ring 18 by a shoulder 17 of the cover 11, the sealing ring 18 being supported by the conically drawn-in upper rim 19 of the casing 1.

This type of diaphragm fastening, which can of course be used in other structural arrangements, offers the advantage that relatively small space is required when compared with common diaphragm fastening between flanges; further advantages are that fixing screws and the necessary holes for such screws can be dispensed with and that easy and convenient assembly is possible.

If the load applied to the control diaphragm 2 is to be changed, this can be effected by turning in or turning out the adjusting screw 12 after the protective cap 14 has been removed. The tension of the load spring 10 is adjusted by this operation.

For the purpose of locking the movable parts of the mechanism during transportation of the regulator, the load spring 10 can be tensioned in such manner that the rim 5 rests on the shoulders 6 so that the weights 3 are held firmly in their position.

Locking the weights 3 and if necessary also the locking of the control diaphragm 2 can of course be effected by means of an additional arresting device which, e. g., can be passed centrically through the adjusting screw 12. Such an additional arresting device has the advantage that the once effected load adjustment is not disturbed.

We claim:

1. In a diaphragm type gas pressure regulator having a control diaphragm and a safety diaphragm disposed above the control diaphragm inside a casing which is closed by means of a cover having an opening therein providing a vent to atmosphere, said safety diaphragm having an opening therein which is small as compared to said opening in said cover, the arrangement of a diaphragm plate which is centrically fastened to the safety diaphragm, a load spring between the control diaphragm and said diaphragm plate and an axially adjustable stop for said diaphragm plate disposed in the cover of the casing, and means whereby the control diaphragm is exposed to and acted upon by the gas.

2. In a diaphragm type gas pressure regulator according to claim 1, an adjusting screw screwed into the cover and protected toward the outside by means of a screw cap, said adjusting screw forming a stop for said diaphragm plate.

3. In a diaphragm type gas pressure regulator according to claim 1, a cup shaped part attached to the control diaphragm, load weights disposed inside said cup shaped part on the control diaphragm, said cup shaped part being provided with an external peripheral flange, and shoulders in the casing on which said flange rests when the stop arranged in the cover is moved downwardly.

(References on following page)

References Cited in the file of this patent

UNITED STATES PATENTS

| | | |
|---|---|---|
| 1,703,531 | Hyde | Feb. 26, 1929 |
| 1,972,234 | Neumann | Sept. 4, 1934 |
| 2,278,728 | McKinley | Apr. 7, 1942 |
| 2,574,700 | Knauss | Nov. 13, 1951 |
| 2,650,456 | Mosier | Sept. 1, 1953 |
| 2,672,891 | Fausek | Mar. 23, 1954 |
| 2,691,461 | Kebbon | Oct. 12, 1954 |

FOREIGN PATENTS

| | | |
|---|---|---|
| 667,694 | Germany | Nov. 18, 1938 |